United States Patent
Zaccaria et al.

(10) Patent No.: US 9,914,547 B2
(45) Date of Patent: Mar. 13, 2018

(54) AIRCRAFT EQUIPPED WITH A DEVICE FOR MONITORING THE ELECTRONIC MANAGEMENT OF THE ENGINES

(71) Applicants: Airbus Operations (SAS), Toulouse (FR); Airbus SAS, Blagnac (FR)

(72) Inventors: Patrick Zaccaria, Grisolles (FR); Emmanuele Costanzo, Toulouse (FR); Laurent Bouin, Fonsorbes (FR)

(73) Assignees: Airbus Operations (SAS), Toulouse (FR); Airbus SAS, Blagnac (FR)

( * ) Notice: Subject to any disclaimer, the term of this patent is extended or adjusted under 35 U.S.C. 154(b) by 2 days.

(21) Appl. No.: 15/141,068

(22) Filed: Apr. 28, 2016

(65) Prior Publication Data
US 2016/0318623 A1    Nov. 3, 2016

(30) Foreign Application Priority Data
Apr. 30, 2015 (FR) .................................. 15 53943

(51) Int. Cl.
| | |
|---|---|
| B64D 45/00 | (2006.01) |
| F02C 9/00 | (2006.01) |
| B64D 31/06 | (2006.01) |

(52) U.S. Cl.
CPC ............. *B64D 45/00* (2013.01); *B64D 31/06* (2013.01); *F02C 9/00* (2013.01); *B64D 2045/0085* (2013.01); *F05D 2260/80* (2013.01)

(58) Field of Classification Search
CPC  B64D 45/00; B64D 31/06; B64D 2045/0085; F02C 9/00; F05C 2260/80
See application file for complete search history.

(56) References Cited

U.S. PATENT DOCUMENTS

| | | | |
|---|---|---|---|
| 2005/0268972 A1* | 12/2005 | Gainford ................... | F02C 7/22 137/601.14 |
| 2006/0260323 A1* | 11/2006 | Moulebhar ........... | F01D 21/003 60/793 |

(Continued)

FOREIGN PATENT DOCUMENTS

EP        2508735       10/2012

OTHER PUBLICATIONS

French Search Report, dated Mar. 18, 2016, priority document.

*Primary Examiner* — Rami Khatib
*Assistant Examiner* — Jeffrey C Boomer
(74) *Attorney, Agent, or Firm* — Greer, Burns & Crain, Ltd.

(57) ABSTRACT

An aircraft comprising at least two engines and an electronic management arrangement comprising a control computer for each engine, each computer being configured for monitoring the operation of its associated engine and for activating an engine protection mode when the engine operation exceeds predetermined operational limits. The electronic management arrangement furthermore comprises an engine interface device to which the control computers are connected, the device prohibiting the activation of a protection mode by a control computer when a protection mode is activated by another control computer. A monitoring device is connected to the control computers and receives an information signal from each control computer to indicate if a protection mode is activated and transmits, in the case where a protection mode is activated on at least two engines, a control signal to the control computer having last activated a protection mode to cancel the activation of the protection mode.

8 Claims, 1 Drawing Sheet

(56) References Cited

U.S. PATENT DOCUMENTS

| | | | |
|---|---|---|---|
| 2008/0208398 A1* | 8/2008 | Delaplace | B64D 31/08 701/3 |
| 2010/0100262 A1* | 4/2010 | Blanvillain | G05D 1/0072 701/14 |
| 2012/0116613 A1* | 5/2012 | Daumas | F02C 9/42 701/3 |
| 2013/0110324 A1* | 5/2013 | Moune | B64C 19/00 701/3 |
| 2013/0110327 A1 | 5/2013 | Fernandez | |
| 2013/0332010 A1* | 12/2013 | Ziarno | G05B 23/0213 701/3 |
| 2013/0332011 A1* | 12/2013 | Ziarno | G05B 23/0213 701/3 |
| 2015/0191251 A1* | 7/2015 | Moune | B64C 13/503 244/195 |
| 2016/0265445 A1* | 9/2016 | Fiedler | F01D 21/02 |

* cited by examiner

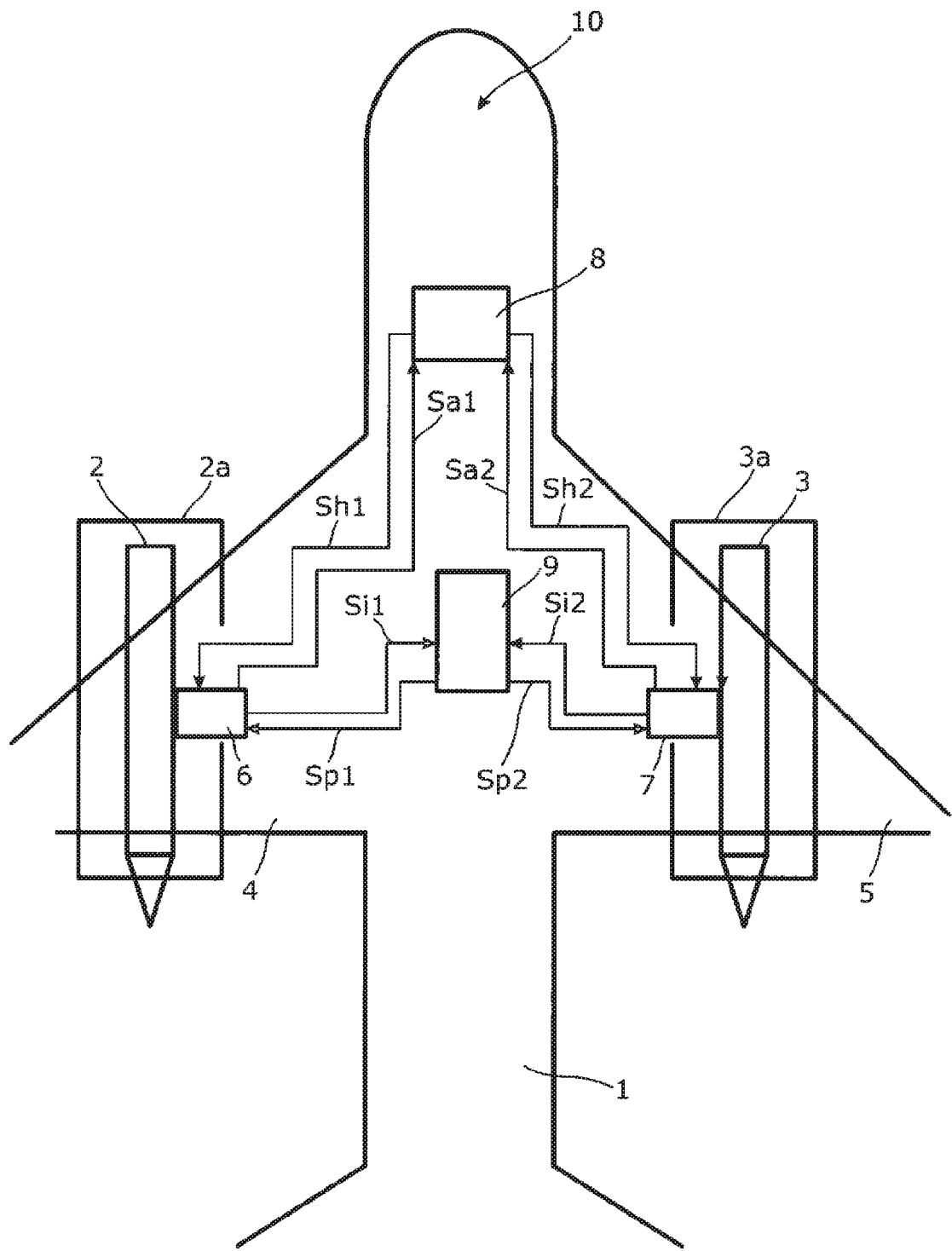

AIRCRAFT EQUIPPED WITH A DEVICE FOR MONITORING THE ELECTRONIC MANAGEMENT OF THE ENGINES

CROSS-REFERENCES TO RELATED APPLICATIONS

This application claims the benefit of the French patent application No. 1553943 filed on Apr. 30, 2015, the entire disclosures of which are incorporated herein by way of reference.

BACKGROUND OF THE INVENTION

The invention relates to an aircraft and more particularly to a device for monitoring the electronic management of the engines in order to monitor and to re-establish the propulsion capabilities of the aircraft in the case of a total or partial shutdown of the engines.

Each engine of an aircraft is monitored by a control computer which is dedicated to it (EEC, the acronym for "Engine Electronic Control"). Such a computer is connected to a system of sensors installed in the different zones of the engine and of its components in order to measure parameters of the engine and, as a function of the measured parameters, the control computer controls the engine. The control computer moreover uses logic allowing the automatic activation of a protection mode when the measured parameters indicate that the operation of the engine exceeds operational limits predetermined by the manufacturer. The protection mode is, for example, activated in rare situations such as cases of overheating of the engine, leakages of liquids such as oil or kerosene or of damage to structural components of the engine resulting from a shock, for example a bird strike on the blades of the fan of the engine.

The activation of the protection mode comprises either of reducing the thrust authorized by the engine to below its maximum thrust in order to preserve its integrity and to reduce the impact of a failure, or of shutting down the engine. Such a mode makes it possible, in cases of anomalies, to quickly reduce (in less than one second) the demands on the engine in order to reduce the risks of propagation of the anomaly.

It is necessary that the protection mode should only be activated on a single one of the engines, because it is required that only the pilot has the power to operate on all of the engines at the same time. In a known way, in order to comply with this requirement, the control computers are connected to an engine interface device which uses logic for inhibiting the protection modes.

The interface device receives information from the control computer of each engine and, when it knows that a protection mode is activated on an engine, it sends a signal to the control computers of the other engines in order to prevent them from activating the protection mode.

The inhibiting device is effective for preventing the activation of the protection mode on more than one engine.

In the case of a total or temporary failure of the inhibiting device, the computers will each be able to activate the protection mode on the engine associated with it without the interface device being able to prohibit this multiple activation. The requirement mentioned above will therefore no longer be complied with. The pilot will of course be able to manually deactivate the protection modes of the engines but this action will take up some of his time and will divert him from his piloting tasks.

There is therefore a need for an additional device making it possible to prevent several engines from being automatically put into protection mode.

SUMMARY OF THE INVENTION

The purpose of the invention is to respond to this need and it relates to an aircraft comprising at least two engines and electronic management means comprising control computers, one for each engine, each computer being configured for monitoring the operation of the engine with which it is associated and for activating a protection mode of the engine when the operation of the engine exceeds predetermined operational limits, a protection mode being of two types, one being a minor protection mode according to which the thrust that an engine can provide is less than its maximum thrust, and the other being a major protection mode according to which the engine is shut down, the electronic management means furthermore comprising an engine interface device to which the control computers are connected, the device being configured for prohibiting the activation of a protection mode by a control computer when a protection mode is activated by another control computer, the electronic management means comprise moreover a monitoring device connected to the control computers, the device receiving an information signal from each of the computers in order to indicate if a protection mode is activated and transmitting, in the case where a protection mode is activated on more than one engine, a control signal to the computer having last activated a protection mode in order to cancel the activation of the protection mode.

According to the invention, the engine management electronics make it possible to cancel, via the monitoring device, the automatic activation of a protection mode on more than one engine.

BRIEF DESCRIPTION OF THE DRAWINGS

The features of the invention mentioned above, as well as others, will become clearer on reading the following description of examples of embodiment, the description being given with reference to the appended FIGURE:

The FIGURE is a diagrammatic view of an aircraft comprising two engines and electronic means for managing the latter according to the invention.

DETAILED DESCRIPTION OF THE PREFERRED EMBODIMENTS

With reference to the FIGURE, the aircraft 1 comprises two engines 2, 3 each of which is arranged in a nacelle 2a, 3a fixed for example under a wing 4, 5 of the aircraft.

The operation of the engines 2, 3 is monitored and controlled by management electronics comprising, in a known way, two control computers 6, 7 for controlling each engine and an engine interface device 8 for harmonizing the control of the two engines by the computers.

A control computer 6, 7 is dedicated to an engine 2, 3 and is, for example, arranged in the nacelle 2a, 3a of the engine. The computer is of a central processing unit type and is connected to a system of sensors (not shown) installed on the engine 2, 3 in order to measure operational parameters of the engine. The control computer 6, 7 is configured for monitoring and controlling the operation of the engine on the basis of the measured parameters. The engine 2, 3 is controlled so that its operation remains within operational limits predetermined by the manufacturer of the engine.

Each control computer 6, 7 comprises logic arrangements automatically allowing the activation of a protection mode of the engine when the operation of the latter exceeds the predetermined operational limits.

There are two types of protection mode:
- a minor protection mode in which the control computer 6, 7 controls the engine 2, 3 so that the latter provides a thrust which is less than its maximum thrust available in normal operation. In this minor protection mode, the thrust that the engine 2, 3 can provide is for example 40 to 90% of its maximum thrust. This mode is activated when the parameters measured by the sensors of the control computer indicate that the engine has an abnormal operation which necessitates a limitation of its performance in order not to damage it; and
- a major protection mode in which the control computer 6,7, controls the engine 2, 3 so that the latter shuts down, for example by cutting off the fuel intake. This mode is triggered following an ingestion of a foreign body (birds) having caused significant damage to the engine.

Each control computer 6, 7 is connected to the interface device 8. The latter is for example arranged in the avionics bay (not shown) of the aircraft.

The interface device 8, of the central processing unit type, receives a signal, called the activation signal, coming from each control computer 6, 7 and transmits a signal, called the inhibit signal, to each of the control computers. The device 8 thus receives the activation signal Sa1 coming from a first computer 6 and the activation signal Sa2 coming from a second computer 7. It transmits the inhibit signal Sh1 to the first computer 6 and the inhibit signal Sh2 to the second computer 7.

The activation signal Sa1, Sa2, for example a Boolean signal with two states, true or false, indicates in a true state if a protection mode is activated by the computer on the engine 2, 3 which is associated with it and in a false state if a protection mode is not activated by a control computer. With regard to the inhibit signal Sh1, Sh2, for example a Boolean signal with two states, true or false, this, in a true state, authorizes a control computer 6, 7 to activate a protection mode or, in a false state, prohibits a computer from activating a protection mode.

The logic used by the interface device 8 is such that the device prohibits a control computer 6, 7 from activating a protection mode via the sending of an inhibit signal Sh1, Sh2 in a false state if the other control computer 7, 6 has already activated a protection mode for the other engine.

According to the invention, the management electronics comprise moreover a device for monitoring the electronic management of the engines, called a monitoring device 9. This device is connected to the two control computers 6, 7 and operates independently from the operation of the interface device 8. The monitoring device 9 is of the central processing unit type and is for example arranged in the avionics bay of the aircraft 1. It receives a signal, called the information signal, from each of the control computers 6, 7 indicating if a minor or major protection mode is activated by a control computer. The monitoring device 9 is moreover capable of transmitting a control signal to each of the computers.

The monitoring device 9 receives an information signal Si1 coming from a first control computer 6 and the information signal Si2 coming from a second control computer 7. It is capable of transmitting the control signal Sp1 to the first control computer 6 and the control signal Sp2 to the second control computer 7. This control signal will be described in detail below.

The logic used by the monitoring device 9 is such that the latter transmits a control signal Sp1, Sp2 to the control computer 6, 7 which last activated a protection mode when the two information signals Si1 and Si2 that it receives indicate that a protection mode is activated for each of the two engines 2, 3. The control signal Sp1, Sp2 comprises, as an instruction, the cancellation of the activation of the protection mode, whether the latter is of the major or minor type.

The control computer 6, 7 which activated a protection mode before the other computer does not receive an information signal Si1, Si2 from the monitoring device 9. Moreover, no control signal Si1, Si2 is transmitted when no or only one of the two control computers 6, 7 has activated a protection mode.

In the case where the cancelled protection mode is of the minor type, the control computer 6, 7 receiving the control signal Sp1, Sp2 controls the engine normally again. A visual and/or audible warning to the pilot is initiated in the cockpit 10 of the aircraft in order to warn the pilot to check the operation of the engine for which the activation of the protection mode has just been cancelled. The pilot can then check the operation of that engine 2, 3 and make the necessary decisions in the case of malfunction of the latter. The pilot retains overall control of the decisions to be made regarding the engines of the aircraft 1.

In the case where the cancelled protection mode was of the major type, the control signal Sp1, Sp2 sent to the control computer 6, 7 comprises moreover additional instructions in order that the computer restarts the engine 2, 3 and again controls the engine normally. The restart is made possible, even in flight, since the time lapse between the shutting down of the engine (activation of the major protection mode) and the restart (cancellation and restart command) is of the order of 200 ms maximum such that the rotating parts of the engine and the injection of fuel have not been suspended. A visual and/or audible warning to the pilot is initiated in the cockpit 10 of the aircraft in order to warn the pilot to check the operation of the engine for which the activation of the protection mode has just been cancelled and which has just been restarted. The pilot can then check the operation of that engine and make the necessary decisions in the case of malfunction of the latter.

According to the invention, the electronics for managing the engines makes it possible to cancel, via the monitoring device 9, the activation of a protection mode on each of the two engines 2, 3. The pilot thus retains sole responsibility for the control of the two engines and, in conformity with the requirement mentioned at the start of the description, the management electronics are authorized to activate a protection mode on only one of the two engines.

It should be noted that the electric signals transmitted between the different elements of the electronics for managing the engines are preferably digital signals, for example encrypted, which are less sensitive to interference than are analog signals.

The above description relates to an example of embodiment of the invention for an aircraft with two engines. Without departing from the scope of the present invention, the invention could be implemented in an aircraft comprising more engines, such as for example an aircraft with four engines.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   at least two engines;
   electronic management means comprising a control computer for each engine,
   each control computer being configured for monitoring an operation of the engine with which that computer is associated and for activating a protection mode of the engine when the operation of the engine exceeds predetermined operational limits,
   the protection mode being either: a minor protection mode in which one of the control computers limits a thrust that an engine provides to be less than a maximum thrust of that engine under normal operations; or, a major protection mode in which one of the control computers shuts down one of the at least two engines;
   an engine interface device comprising a computer to which the control computers are connected, the engine interface device being configured for prohibiting the activation of the protection mode of one engine by one of the control computers when the protection mode for the other engine is activated by the control computer for the other engine; and,
   a monitoring device comprising a computer connected to the control computers, the monitoring device configured to receive an information signal from each of the control computers in order to indicate if the protection mode is activated for each of the engines and to transmit, in the case where the protection mode is activated on more than one engine, a control signal to the control computer having last activated the protection mode in order to cancel the activation of the protection mode.

2. The aircraft as claimed in claim 1, wherein the information signal comprises information regarding the protection mode activated.

3. The aircraft as claimed in claim 2, wherein the control signal comprises an instruction to restart the engine for which the protection mode has been cancelled.

4. The aircraft as claimed in claim 1, wherein the monitoring device transmits at least one of a visual and audible warning to a pilot of the aircraft when the activation of the protection mode is cancelled.

5. The aircraft of claim 1, wherein the informal signal and the control signal are each a digital signal.

6. The aircraft of claim 5, wherein the digital signals are encrypted.

7. The aircraft of claim 1, wherein the thrust that the engine provides when in the minor protection mode is between 40 to 90% of the maximum thrust of that engine under normal operation.

8. The aircraft of claim 1, wherein the computer of the engine interface device is configured to operate independently of the computer of the monitoring device.

* * * * *